Feb. 15, 1966  D. L. FAIN ET AL  3,234,844
TORSIONALLY DRIVEN SCANNING MIRROR
Filed June 14, 1961  2 Sheets-Sheet 2
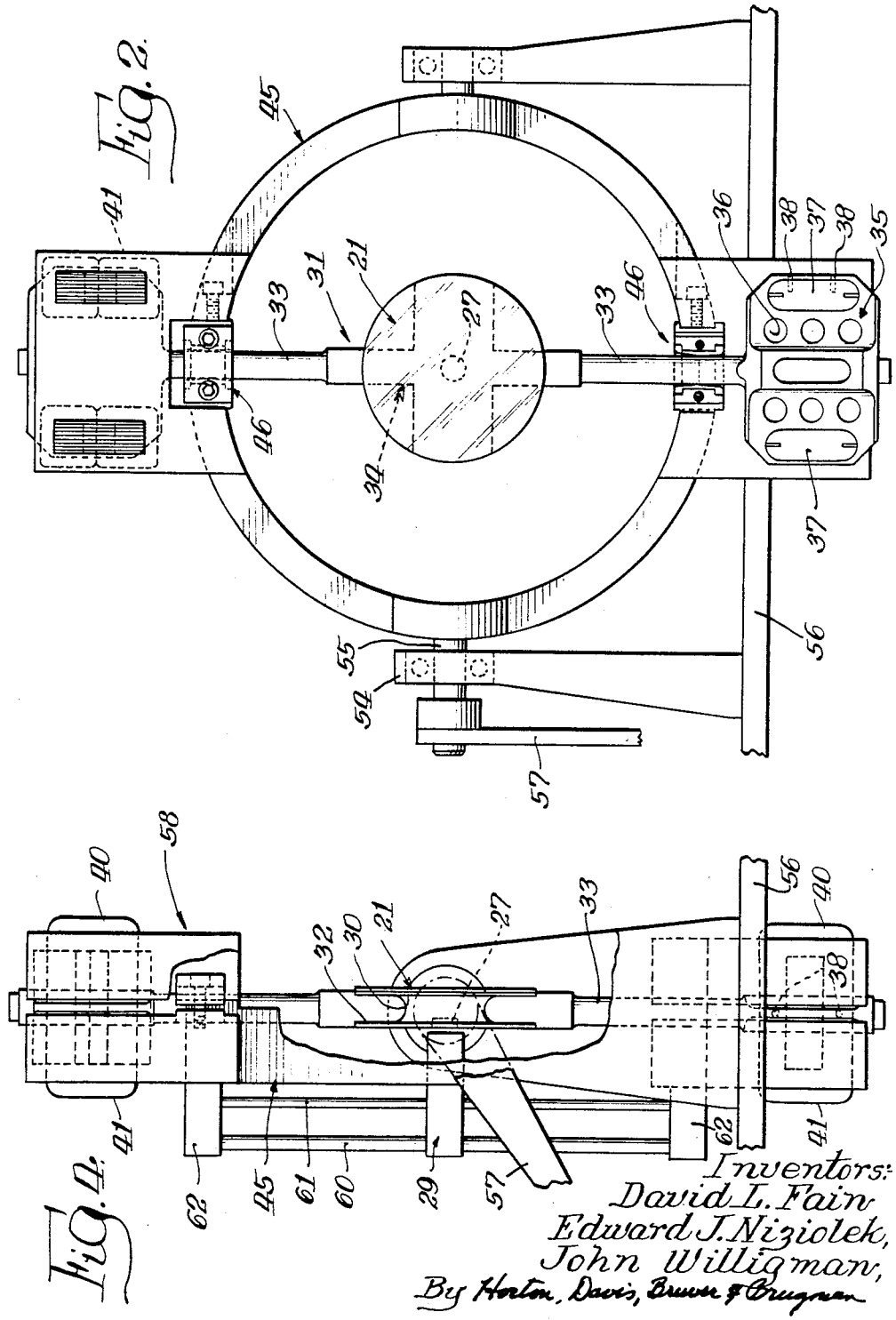
Inventors:
David L. Fain,
Edward J. Niziolek,
John Willigman,
By Horton, Davis, Bruce & Brugman
Atty's.

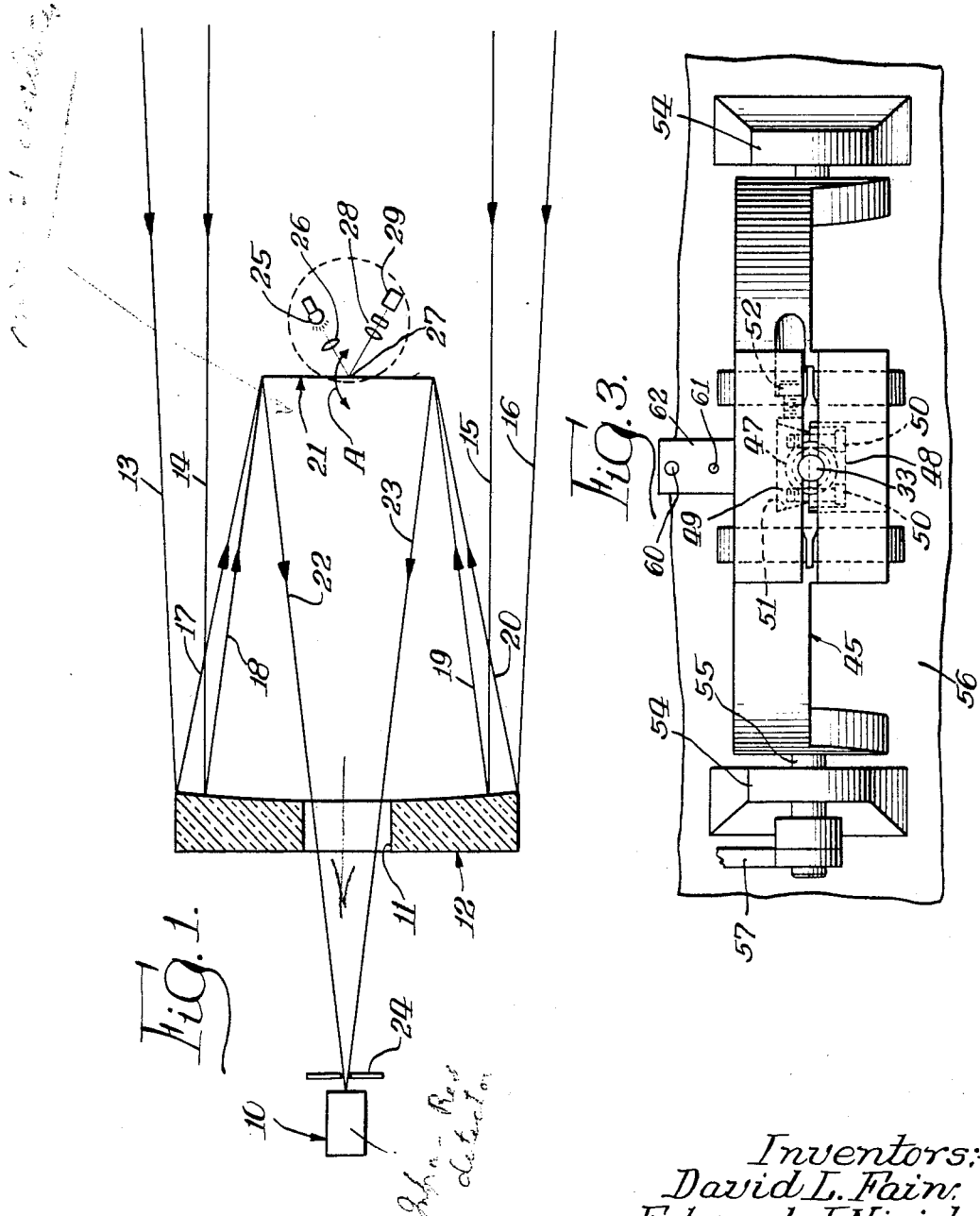

United States Patent Office 3,234,844
Patented Feb. 15, 1966

3,234,844
TORSIONALLY DRIVEN SCANNING MIRROR
David L. Fain, Boulder, Colo., and Edward J. Niziolek, Cicero, and John Willigman, Elk Grove Village, Ill., assignors, by mesne assignments, to Infrared Industries, Inc., Santa Barbara, Calif., a corporation of Delaware
Filed June 14, 1961, Ser. No. 117,130
9 Claims. (Cl. 88—1)

This invention relates generally to optical systems, and more particularly to improve mechanical means for optically scanning target areas at high frequencies.

Recent developments in the art of infra-red physics have brought about more widespread and popular use of detecting devices in which infra-red energy is utilized for such purposes as detecting variation in temperature, the presence and positions of energy emitting objects, the measurement of absolute radiation patterns and like items. In some instances. it is desired to determine the motion of objects within or across a field of view, and in that event, it is essential that the area be viewed or scanned at a fairly substantial rate for optimum evaluation. While electronic means having high speed storage mosaics for scanning visible light energy patterns have been perfected, no such means sensitive to intermedate or long wave length energy is yet available for electronioally scanning infra-red energy patterns. Therefore, presently known infra-red scanning devices by and large embody mechanical scanning systems generally employing a single element infra-red detector.

Known systems of mechanical scanning are characterized by embodying means moving mirrors in either the object plane or in the image plane of an optical system, and in certain instances, employing reticle means in the image plane. Such previous systems, however, are not adequate for high speed, high sensitivity scanning, mainly because of inherent large inertial moments and mass systems for the scanning mechanisms which prevent rapid scanning rates and dependable operating life.

The present invention avoids many of such heretofore recognized defects in mechanical scanning equipment, and provides means for mechanically achieving scanning rates approaching the standards of electronic scanning devices. In brief, the present invention embodies an optical system in which a scanning mirror is mechanically oscillated at high frequencies. The reflective system employed provides total spectral response without chromatic aberration, and is considered unique in that it is neither an image nor an object plane scanner, but involves scanning by mirror means located in the focusing beam, but at a position displaced from the beam's focal point. The scanning mirror is further characterized as a folding mirror adapted to rotate about transverse axes to provide area scan. While mechanical drive means are used to drive the mirror assembly, such drive means are maintained at minimum size and located outside of the system's optical path. Means are also embodied to avoid untoward motion of parts which might alter the effective aperture size or location in the optical system during a scanning cycle.

Generally speaking, the mirror means embodied in this invention is mechanically oscillated, at frequencies in the kilocycle range, substantially in accordance with the principles of torsional pendulums embodying two or more oscillating masses set in motion by external torque sources to obtain at least one nodal point of neutral angular movement for torsion rod means interconnecting the oscillating masses. By clamping or supporting the torsion rod means at its nodal point of movement and supplying external driving torque thereto at its natural resonant frequency, sustained oscillation of the system is obtained at considerable amplitude and with minimum expenditure of energy.

The main object of this invention is to provide an improved scanning means and unique torsional oscillator means therefor.

Another object of this invention is to provide an improved optical system embodying mechanically driven mirror means for automatic scanning devices.

An additional object of this invention is to provide an improved reflective optical system for scanning devices and comprising mechanical area scanning means productive of high frequency scanning rates approaching the standards of electronic scanning systems.

A still further object of this invention is to provide improved mechanical means for rapidly oscillating a mirror assembly in a reflective optical system, which drive means is compact, is located outside of the optical path for the optical system and imparts torsional driving force to the oscillating mirror assembly with marked efficiency.

Still another object of this invention is to provide a reflective optical system and mechanical drive means as aforesaid which is especially adapted for use in infra-red scanning devices.

The above and further objects, features and advantages of this invention will appear to those familiar with the art from the following detail description of a preferred embodiment thereof illustrated in the accompanying drawings.

In the drawings:

FIG. 1 is a schematic representation of a typical optical system according to the present invention;

FIG. 2 is a front elevational view of the oscillating mirror means and its associated drive means employed in the optical system of FIG. 1;

FIG. 3 is a partial cross-sectional view taken substantially at line 3—3 of FIG. 2; and FIG. 4 is a view in side elevation of the assembly set forth in FIG. 2.

Those familiar with the art will recognize that while the description which follows is directed to the embodiment of the present invention in optical scanning means, particularly infra-red scanning devices, it is by no means limited to such field, since its utility is obviously independent of the type of energy scanned by the optical system, or for that matter, by the particular instrumentation in which it is embodied.

Referring specifically to FIG. 1, it will be understood that a conventional infra-red detector device, indicated generally at 10, receives infra-red energy through a central aperture 11 of a stationary collecting mirror 12, placed at an appropriate distance therefrom in a reflective optical system as illustrated. Mirror 12 receives energy, as indicated by energy rays 13, 14, 15 and 16, from an emitting target and reflects the same, as by folded rays 17, 18, 19 and 20, to the reflective surface of a planar folding mirror 21, comprising the driven part of a unique torsional oscillating system.

The mirror 21 oscillates in two modes or about two axes, one axis being normally vertical as indicated by arrow line A in FIG. 1, and the other axis being transverse thereto or horizontal, not shown. Energy striking mirror 21 is reflected, as by rays 22 and 23, through the central aperture 11 of the stationary collecting mirror and a limiting aperture means 24 to the detector device 10.

An optical position transducer, comprising a light source 25, a focusing lens means 26, a transducer mirror means 27, a lens and aperture means 28, and a photocell 29, is advantageously coupled to the oscillating mirror 21 for the purpose of determining the latter's angular motion as will be amplified in greater detail hereinafter.

Looking now at FIGS. 2 through 4 of the drawings, the features and characteristics of a unique torsional oscillating system and the means employed for driving the folding mirror 21 of this invention will be considered. Mirror 21, comprising a highly polished reflective plate or planar glass mirror, is mounted over one face of a central mounting platform portion 30 of a unitary torsional oscillator means 31; mirror 21 being circular and held in place on mounting platform 30 by a suitable adhesive capable of withstanding imposed stresses and differentials in characteristics, if any, between the material of the mirror, such as glass, and the material of the torsional oscillator 31, which is preferably metal. In practice, an epoxy film has been found satisfactory for mounting mirror 21. Co-extensive with mounting platform 30 is a structurally symmetrical counter balancing platform 32, parallel to platform 30 and on the opposite face of the oscillator means 31 behind folding mirror 21. Mounted centrally of the second mounting platform is the small transducer mirror 27 mentioned above.

Aside from the two central mounting platform portions 30 and 32, the oscillator means 31 comprises a pair of cylindrical torsion rod portions 33, 33, co-axially aligned and extending from opposite sides of its central body mass or portion designated generally at 34, the same being formed integrally with rod portions 33 and the two platform portions 30 and 32. In this respect, certain areas of the body portion 34 are milled or cut away for the purpose of controlling and adjusting weight and mass distribution, as illustrated.

At the outer end of each of the torsion rod portions 33 is a driving paddle 35, comprising a substantially rectangular section, whose thickness is such as to lie wholly between the planes of the mirror supporting platform portions 30 and 32, and which is otherwise disposed symmetrically of the longitudinal axis of the oscillator means 31. A number of limber holes or openings 36 are advantageously formed through each driving paddle 35 to control weight and mass distribution, and to minimize air resistance. Mounted adjacent opposite edges of each driving paddle are ferromagnetic armature plates 37, comprising magnetic pole pieces which are fastened in place by pin means 38, 38 or like connective devices.

It is to be understood that the entire torisional means 31 except for the mirror elements 21 and 27 and the armature pole pieces 37, 37, is preferably machined out of a single solid piece of metal, carefully selected for optimum elasticity, yield strength and fatigue characteristics to provide a unitary torsional pendulum or mass-spring system. In practice, it has been found that tempered aluminum alloys are best suited for the oscillator means with the ratio of yield strength to torsional modulus of elasticity being the dominant control factor for achieving desired results. Other factors such as the ratio of length/diameter for the torsion rod sections 33 are also important to achieve operation within maximum stress limits while producing desired torsional spring constants. Of critical importance in this respect is the elimination of any and all surface discontinuities and stress concentration areas which might produce fatigue failures. To this end, it is preferred that the surfaces of the oscillator means 31 be highly polished, which precaution greatly increases operating life for the oscillator means.

In considering the means for driving the oscillator means 31, normal mechanical drive means are generally unsatisfactory due to size and driving power requirements necessitated by the high speed operation and the attending excessive reaction forces produced at the kilocycle frequencies. In order to gain the desired results, the oscillator means preferably is a self-resonant system, with the driving or energy imparting means serving to restore the losses of operation so as to maintain the resonant condition. Basically, if minimum power requirements are to be met while obtaining high frequency operation with greatest efficiency, excessive energy losses within the torsional oscillator system itself, as well as in the means for coupling driving force thereto, must be avoided. These desirable factors are met by maintaining the oscillator's torsional moment of inertia at a minimum while keeping the restoring force or spring constant high, and accompanying the overall system with minimum possible air and frictional losses. In order to satisfy these demands, the herein disclosed embodiment utilizes electromagnetic drive means at opposite ends of the oscillator means, such as the pairs of electromagnetic drivers 40 and 41 mounted adjacent the driving paddle sections 35 and powered according to conventional practice. These magnetic drivers avoid actual physical connection with the oscillator 31, and thereby provide a drive system having minimum frictional loss in its coupling with the oscillator. It is also to be noted that since the magnetic power is delivered to the oscillator means at both its ends, substantially twice as much power may be imparted for a given size magnet structure, while at the same time maintaining the driving means out of the optical path for the scanning system.

Having thus described the torsional oscillator and its driving means, consideration now will be given to the system for supporting the oscillator for high frequency operation.

As best seen on FIGS. 2 and 3, the torsional oscillator 31 is mounted diametrically across a torsion rod retaining ring 45 by means of a pair of nodal clamp ring assemblies 46, 46 which engage the torsion rod portions 33 and are adjustably secured at diametrically opposed locations on the retaining ring 45. More particularly, each assembly 46 comprises a split or two-part clamp ring 47 of a comparatively resilient material having an annular bearing edge portion on its internal surface for engaging the external cylindrical surface of its associated torsion rod portion 33 with substantially annular line contact.

In this regard, the two halves of the clamp ring 47 are carried one in each of a pair of ring retaining block members 48 and 49 (see FIG. 3), which in turn are held together by a pair of cap screw members 50, 50 or the like to securely hold the clamp ring 47 around its associated torsion rod section 33. The block member 49 of each assembly is trapezoidal shaped, as shown best in FIG. 3, and is slidingly received in a mating guideway 51 formed in one face of the retaining ring 46. A single adjustable retaining screw 52 serves to hold the block assembly member 49 in the guideway 51. With this arrangement, it will be readily understood that the ring retaining block assemblies and their clamp ring 47 may be readily adjusted along the length of the torsion rod portions 33 so as to be disposed at selected positions thereon according to nodal location. This positional adjustment system for the oscillator supports makes it possible to compensate for any material variation in the oscillator's construction which might produce a shifting in the calculated nodal points for the oscillating spring mass; it being an important feature of the present invention to clamp or hold the oscillator means 31 at its nodal points, as will be discussed more fully hereinafter.

While the oscillator means is mounted on the torsion bar retaining ring 45 as above described, the latter is rotatably held by trunnion pedestals 54, which journal trunnion projections 55, 55 extending from opposite sides of the ring 45 substantially at right angles to the rotational axis for the oscillator means. The trunnion pedestals 54 in turn are held or supported on an underlying support plate 56, comprising a part of suitable instrumentation structure or housing associated with the optical system of FIG. 1. A suitable driving linkage, indicated at 57 and coupled to a source of driving power (not shown), is adapted to provide oscillating motion to the torsion bar retaining ring 45; the said driving linkage being coupled to one of the trunnion projections 55, as shown in FIG. 2.

While the means for powering the linkage 57 is not shown herein, it may comprise any suitable means, such as an electric motor or the like. With the support system as above described providing oscillations of the torsion bar retaining ring 45 about an axis defined by the trunnion projections 55, 55 and with such axis lying transverse to the axis of oscillation for the torsional oscillator 31, a two-dimensional or area sweep movement for mirror 21 is achieved. In practice it has been found convenient and acceptable to oscillate the torsion bar retaining ring 45 at frequencies in the neighborhood of 10 c.p.s.

Turning now to the particulars of supporting the torsion oscillators 31 in the ring assembly 46, it will be recalled that each of the split bearing ring members 47 is intended, insofar as possible, to provide substantial line contact with its associated torsion rod 33, and to that end, the same comprises a knife-like edge portion, as previously described. Such clamp rings further are preferably constructed of resilient material, such as Teflon or the like, to avoid marring the torsion rod surface, with the location of its line of contact with the torsion rod section occurring at the nodal point of minimum or zero surfaces motion for the torsion rod section.

To better understand the occurrence of such a nodal point of substantially zero surface movement for the torsion rod section, if each driver paddle mass 35 at one end of the associated torsion rod section is considered to be a first inertial mass of a torsional pendulum system and the mirror supporting mass at the other end of the torsion rod section is considered to be a second inertial mass, it readily will be recognized that rotational oscillation of the driver paddle as produced by the magnetic driver system or a similar means, will cause a following torsionally produced reactive movement of the central mirror section or second inertial mass in the system. Such torsional driving of the central mirror supporting mass, in response to the application of torque force to the driver paddle mass, produces a twisting action of the intervening torsion rod portion 33, with the inertia of the mirror supporting mass causing the same to move out of phase or at a later point in time than the driven paddle driver mass. This inertial lag of the mirror supporting section causes an effective relative movement between the two inertial masses and with rapid reversal of the direction of movement in response to reversing torque impulse to the driver paddle, certain surface elements along the length of the intervening torsion rod portion 33 are stationary or at node point of motion. It is at such nodal point, where the surface elements of the torsion rod section 33 are stationary, that supporting the torsional oscillator may be carried out with minimum loss of energy since there is no vibrational motion of the torsion rod to be transmitted through clamping means at such point. Also, since there is little or no relative movement between the torsion rod and its clamping means at such nodal suspension point, subtantially all wear of such members is avoided with this suspension system.

Of further importance and consideration in accomplishing nodal support of the oscillator 31 is the fact that if the moments of inertia for the mirror supporting mass and the driver paddle mass are properly regulated and selected, the nodal support points therebetween may be moved toward the mass having the largest inertia. If the driver paddle masses are therefore proportioned properly, the nodal points of support may be made to move toward the driver paddle portions. This effectively removes the supports from the optical path of the scanning system and has particular advantage in coupling the magnetic drivers thereto since the larger paddle masses require less rotational motion than the smaller central mirror supporting mass for a given desired displacement of the latter. As a consequence, less air gap and a more efficient electromagnetic coupling is permitted by proportioning the driver paddle masses to have a larger inertia than the central mirror supporting mass.

Turning now to the manner of driving or imparting torsional impulse to the oscillator means 31, as mentioned previously, a pair of electromagnetic drivers 40 and 41 are disposed adjacent the opposite ends of the oscillator means so as to cooperate with the pole pieces 37, 37 associated with the driver paddle portions 35. Such magnetic drivers 40, 41 are suitably carried in housing means 58 supported on the torsion bar retaining ring 45 and driving unbalance is avoided by coupling the magnetic drivers in push-pull and disposing the same symmetrical of and at the opposite ends of the oscillator means.

In order to drive the torsional oscillator with minimum energy, the magnetic drivers are operated at the exact resonant frequency of the torsion bar oscillator itself, employing a regenerating drive system. In this type of drive system, tte operating drive frequency is controlled to be at the resonant frequency of the torsion bar system, so that power required to drive is maintained at minimum levels. To accomplish this, the motion of the torsionally suspended mirror 21 is used at the frequency determining element for the drive system. In order to avoid any power loss from a mechanical coupling with the resonant oscillator means, position sensing of mirror 21 is conveniently accomplished by use of an optical transducer. To that end, the mirror supporting section of the oscillator means 31, and more particularly the platform portion 32 thereon, is equipped with the central reflective mirror member 27 which moves with and according to the oscillations of the folding mirror 21. As diagrammed in FIG. 1 of the drawings, mirror 27 is impinged with energy from a steady source 25 which passes through a focusing lens 26 to mirror 27 wherefrom it is reflected to a collecting lens system 28 and focused on the photocell 29 carried by tie rods 60, 61 held between projecting support members 62 of the torsion bar retaining ring 45 (see FIG. 4).

This system produces a signal at the photosensitive device 29 in accordance with the oscillating movements of the mirror 21, or more specifically, the central reflective mirror 27 as desired. This sensing of the mirror's motion is further accomplished without actual mechanical loading or coupling of the mirror, as might occur if some mechanical sensing means were employed. In any event, the light deflected from the mirror 27 produces a signal at the photocell which is modulated according to the motion of the mirror 21. The signal at the photocell is then amplified and fed to a suitable electronic driving amplifier (not shown) which in turn drives the mechanical, or in this case, electromagnetic drivers, to complete the regenerating loop by which driving impulse is imparted to the torsional rod oscillator means according to the frequency of oscillation for the folding mirror 21. Preferably suitable limiting circuits are also employed in the regenerative loop, according to known practices, to maintain a desired driving amplitude for the system.

From the foregoing, it is believed that those familiar with the art will readily recognize the unique features and advantages of the present invention, whereby a rapid scanning capability with frame rates approximating television or electronic scanning frequency and productive of a substantially flickerless display of a thermal area or scene is accomplished. Further, the basic component or torsional oscillating means which permits the attainment of the high scanning rate is distinguished by such features as the shifting nodal point between opposed oscillating inertias or masses and balanced construction, which eliminates translational forces and loss of energy to retaining structures; the nodal point suspension of the torsion rod system being accomplished through adjustable resilient clamping devices. It is also to be recognized that the regenerative drive system used permits the operating frequency to be determined by the mechanical resonance of the oscillator means itself. It is further to be understood that while the present invention has been described in conjunction with a preferred embodiment as herein described and shown in the accompanying drawings, numerous changes, modifications, and substitution of equivalents may be made therein without necessarily departing from the spirit and scope of this invention. As a consequence, it is not intended that this invention be limited by the foregoing description, except as may appear in the following appended claims.

We claim:

1. In an optical scanning device incorporating means for detecting light energy including an area scanning optical system for focusing energy to the detecting means, improved means for mechanically oscillating mirror means in the optical system comprising, unitary torsional oscillator means having a first mass for receiving torsional driving force, a second mass remote from said first mass and comprising the mirror means to be oscillated, torsion rod means formed integrally with and coupling said two masses and arranged so that the latter are symmetrical of the longitudinal axis of said rod means, driver means remote from said mirror means for imparting torsional driving force to said first mass in a manner to torsionally drive and oscillate said mirror means about said longitudinal axis, support means for said oscillator means, and clamp means carried by said support means and adapted to fixedly hold said torsion rod means substantially at its nodal point of movement between said two masses.

2. In an optical scanning device incorporating means for detecting light energy including an area scanning optical system for focusing energy to the detecting means, improved means for mechanically oscillating mirror means in the optical system comprising, unitary torsional oscillator means having a first mass for receiving torsional driving force, a second mass remote from said first mass and mounting the mirror means to be oscillated, torsion rod means integrally interjoining said two masses and arranged so that the latter are symmetrical of the longitudinal axis of said rod means, driver means for imparting torsional driving force to said first mass in a manner to torsionally oscillate said mirror means about said longitudinal axis, support means for said oscillator means, and adjustable clamp means carried by said support means and adapted to be moved adjustably along said torsion rod means for the purpose of regulating its position of engagement with said rod means substantially at a nodal point of movement thereof between said two masses.

3. In an optical scanning device incorporating means for detecting light energy including an area scanning optical system for focusing energy to the detecting means, improved means for mechanically oscillating mirror means in the optical system comprising, unitary torsional oscillator means having a first mass for receiving torsional driving force, a second mass remote from said first mass for mounting the mirror means to be oscillated, torsion rod means formed integrally with and coupling said two masses and arranged so that the latter are symmetrical of the longitudinal axis of said rod means, driver means for imparting torsional driving force to said first mass in a manner to oscillate said oscillator means and torsionally drive said mirror means about said longitudinal axis, support means for said oscillator means, and clamp means carried by said support means and adjustable for tuning said oscillator means by holding said rod means substantially at a nodal point of movement thereof between said first and second masses.

4. The combination as set forth in claim 1 including means for oscillating said support means about an axis generally transverse to the axis of oscillation for said mirror means whereby to move the latter in two modes to effect area scanning thereby.

5. The combination as set forth in claim 1 in which said driver means comprises electromagnetic means adjacent said first mass for applying torque to the latter according to the resonant frequency for said oscillator means.

6. The combination as set forth in claim 5 including position transducer means coupled to said oscillator means and said driver means and adapted to establish driving frequency for said driver means resonant with the oscillating frequency of said mirror means.

7. The combination as set forth in claim 6 in which said position transducer means is optically coupled to additional mirror means carried by said oscillator means.

8. In an optical scanning device incorporating means for detecting light energy including an area scanning optical system for focusing energy to the detecting means, improved means for mechanically oscillating mirror means in the optical system comprising, unitary torsional oscillator means having a first mass for receiving torsional drive force, a second mass remote from said first mass for mounting the mirror means to be oscillated, first torsion rod means integrally coupling said two masses and extending therebetween, a third mass for receiving additional torsional driving force, a second torsion rod means extending coaxial of said first rod means and integrally coupling said third mass with said second mass; said first and third masses being symmetrically disposed with respect to said second mass and all three masses being disposed symmetrical of the longitudinal axes of said two torsion rod means; driver means adjacent said first and third masses for simultaneously imparting torsional driving force thereto in a manner to torsionally drive and oscillate said mirror means about said longitudinal axes, support means for said oscillator means, and adjustable clamp means carried by said support means and adapted to hold said first and second torsion rod means at respective nodal points of movement thereof.

9. In a scanning device having means for detecting light energy and an optical energy scanning and transmitting system including oscillating mirror means, improved means for mechanically oscillating the mirror means comprising unitary torsional oscillator means having three oscillating masses, namely, a central mirror supporting mass and a pair of driver masses disposed at diametrically opposite sides of said mirror supporting mass and spaced outwardly therefrom; coaxially aligned torsion rod portions formed integrally with and extending between said central mass and said driver paddle masses, all three masses being disposed symmetrically of the longitudinal axis of said torsion rod portions and said driver paddle masses being disposed symmetrically of said central mass; driver means adjacent each of said driver paddle masses for imparting periodic driving torque impulses thereto whereby to torsionally oscillate said central mass in response to torsional impulses transmitted thereto by said torsion rod portions, and means for supporting said torsional oscillator means comprising plural clamp means associated one with each of said torsion rod portions and engaging the same at a nodal point of movement therefor.

References Cited by the Examiner

UNITED STATES PATENTS

| 2,911,470 | 11/1959 | Greenleaf et al. | |
| 2,930,894 | 3/1960 | Bozeman | 88—1 X |
| 3,020,414 | 2/1962 | McKnight et al. | 88—1 X |
| 3,087,373 | 4/1963 | Poor et al. | 88—1 |

FOREIGN PATENTS 1,149,437  7/1957  France.

EMIL G. ANDERSON, *Primary Examiner.*